(12) United States Patent
Bonhomme (10) Patent No.: US 7,035,357 B2
(45) Date of Patent: Apr. 25, 2006

(54) PROCESS AND DEVICE FOR EXTRACTING DIGITAL DATA CONTAINED IN A SIGNAL CONVEYED BY AN INFORMATION TRANSMISSION CHANNEL, IN PARTICULAR FOR A CELLULAR MOBILE TELEPHONE

(75) Inventor: Corinne Bonhomme, Sergy (FR)

(73) Assignee: STMicroelectronics N.V., Amsterdam (NL)

( * ) Notice: Subject to any disclaimer, the term of this patent is extended or adjusted under 35 U.S.C. 154(b) by 732 days.

(21) Appl. No.: 09/876,879

(22) Filed: Jun. 7, 2001

(65) Prior Publication Data

US 2002/0041642 A1    Apr. 11, 2002

(30) Foreign Application Priority Data

Jun. 8, 2000    (EP) .................................. 00111847

(51) Int. Cl.
  *H03D 1/00*    (2006.01)
  *H03H 7/30*    (2006.01)
(52) U.S. Cl. ...................................... 375/343; 375/232
(58) Field of Classification Search ................ 375/343, 375/142, 233, 350, 232
  See application file for complete search history.

(56) References Cited

U.S. PATENT DOCUMENTS

| | | | | | |
|---|---|---|---|---|---|
| 5,251,237 | A | * | 10/1993 | Baier | 375/346 |
| 5,513,215 | A | * | 4/1996 | Marchetto et al. | 375/233 |
| 6,044,111 | A | | 3/2000 | Meyer et al. | 375/231 |
| 6,507,602 | B1 | * | 1/2003 | Dent | 375/142 |
| 6,590,932 | B1 | * | 7/2003 | Hui et al. | 375/232 |

* cited by examiner

*Primary Examiner*—Stephen Chin
*Assistant Examiner*—Cicely Ware
(74) *Attorney, Agent, or Firm*—Lisa K. Jorgenson; Allen, Dyer, Doppelt, Milbrath & Gilchrist, P.A.

(57) ABSTRACT

A device includes a receiver including an estimation block for estimating the impulse response of the transmission channel and a transformation block. The transformation block may include a preprocessing block for determining a phase minimum transformed impulse response corresponding to a transformed channel based upon the estimated impulse response of the transmission channel, and a filter for filtering the signal received. This makes it possible to retain equality between the autocorrelation of the signal received and the autocorrelation of the filtered signal. Further, the receiver may include an equalizer for applying an equalization processing operation to the filtered signal while taking account of the transformed impulse response.

18 Claims, 4 Drawing Sheets

PROCESS AND DEVICE FOR EXTRACTING DIGITAL DATA CONTAINED IN A SIGNAL CONVEYED BY AN INFORMATION TRANSMISSION CHANNEL, IN PARTICULAR FOR A CELLULAR MOBILE TELEPHONE

FIELD OF THE INVENTION

The invention relates to the field of telecommunications, and, more particularly, to the transmission of digital information including the equalization of a received digital signal. More specifically, the invention also relates to the extraction of digital data contained in a signal conveyed by an information transmission channel including an information sender, an information receiver and a means of propagation extending between the sender and the receiver.

BACKGROUND OF THE INVENTION

The present invention applies in particular, but not exclusively, to the cellular mobile telephone domain, such as that provided for in the Global System for Mobile Communications (GSM) standard. The means of propagation of the digital signal can be air in the case of cellular mobile telephones, or else any other means of propagation such as a cable, for example, in other applications.

A fundamental factor limiting the performance of a digital communication system is the phenomenon known as "inter-symbol interference." Such inter-symbol interference causes, at the receiver level, temporal occupation of each symbol transmitted (e.g., a bit) that is longer than the initial duration of the symbol (also referred to as the "bit time," for example). Stated otherwise, the signal received at a given instant does not depend on one symbol alone (e.g., a bit) but also on the other bits or symbols sent which extend over durations greater than those of a bit time.

In practice, the signal received at a given instant depends on the symbol concerned, and also on the adjacent symbols. There are several causes of inter-symbol interference. One of them is due in particular to the multiple propagations of the signal between the sender and the receiver when the signal is reflected or diffracted by various obstacles which, upon reception, leads to several signal copies mutually shifted in time.

Other causes disturb the analysis of the symbols received. These may include additions of miscellaneous signals and noise, such as thermal noise, miscellaneous transmissions from other senders, and most of the other interference caused by the other senders (e.g., GSM) using the same frequency band at the same moment or else an adjacent band. Moreover this interference between symbols is produced not only by the means of propagation between the sender and the receiver but also by the sending/receiving devices themselves (modulator, filter, etc).

During communications with interference between symbols, the problem of estimating the impulse response of the transmission channel may arise. The quality of this estimate depends on one's capacity to eliminate the interference between symbols, and hence to make correct decisions regarding symbols sent. Generally, the estimate of the impulse response of the channel, or more simply the "channel estimate," is effected within the GSM telephone domain. In particular, this may be done by using least squares techniques and by using a predetermined sequence of symbols known to the sender and to the receiver. This is commonly referred to as a "training sequence." This training sequence is present within each symbol train (or "burst") sent.

When the characteristics of the channel are sufficiently well estimated, the estimated coefficients of the impulse response of the channel are used in a so-called "equalization" processing operation, as will be appreciated by those of skill in the art. This is done to decode the signal received, i.e., to retrieve the logic values of the bits (data) sent in the train. The equalization processing operation is conventionally followed by the so-called "channel decoding" processing operations for reconstructing the information (e.g.; speech) initially coded at the sender.

There are numerous equalization algorithms which are well known to the person skilled in the art. Among these equalization processing operations, two major classes are considered herein. This first class is those operations which carry out detection symbol by symbol, such as the algorithm known as decision feedback equalization (DFE), for example, the essential aspects of which are described in "Digital Communications" by John G. Proakis, third edition, McGraw-Hill, Inc. The second class is those operations which carry out the detection of a sequence of symbols, such as the algorithms known as maximum likelihood sequence estimation (MLSE) or decision feedback sequence estimation (DFSE), for example. These two algorithms are the subject of numerous publications. For example, additional reference regarding the MLSE algorithm is provided in the work by John G. Proakis cited above, and for the DFSE algorithm additional reference is provided in an article by Hans C. Guren and Nils Holte entitled "Decision Feedback Sequence Estimation for Continuous Phase Modulation on a Linear Multipath Channel," IEEE Transactions on Communications, Vol. 41, No. 2, February 1993.

The symbol by symbol detection algorithms have low complexity relative to the sequence-based detection algorithms, but they give inferior performance. This is why equalization algorithms using sequence-based estimation are generally preferred. However, the MLSE algorithm, which is an optimal algorithm, may be difficult to implement because of its complexity in certain applications, such as quadrature modulations ("M-ary" modulations). In particular, these may include a QPSK modulation (2 bits per symbol) or 8PSK modulation (3 bits per symbol), as will be understood by those of skill in the art.

In such applications, the DFSE algorithm is then preferably used. This also makes it possible to carry out the sequence detection while reducing, for example, the number of states of the trellis used in this algorithm by a decision feedback mechanism. Lower complexity is then obtained, and hence easier implementation, but lower performance.

SUMMARY OF THE INVENTION

An object of the invention is to improve the performance of the equalizers customarily used, in particular the DFSE equalizer, by reducing the errors induced by the decision feedback mechanism.

Although the invention can be applied to any type of equalization algorithm, in particular the MLSE algorithm, it applies advantageously to the DFSE algorithm, and its purpose is to significantly enhance the performance thereof while reducing the complexity of this algorithm. This may be done, for example, by using trellises of restricted size, such as trellises with 8 states for an 8PSK modulation.

The invention therefore provides a process for extracting digital data contained in a signal conveyed by an information transmission channel including an information sender, an information receiver, and a means of propagation extending between the sender and the receiver. According to the invention, this process may include, at the receiver, a processing operation for estimating the impulse response of the transmission channel. Further, an equalization processing operation may include determining, on the basis of the estimated impulse response of the transmission channel, a so-called "phase minimum" transformed impulse response corresponding to a transformed channel and filtering the signal received by a filter to preserve equality between the autocorrelation of the signal received and the autocorrelation of the filtered signal. Also, an equalization processing operation may be applied to the filtered signal while taking account of the transformed impulse response.

The invention therefore applies an equalization processing operation, such as a conventional equalization processing operation, not directly to the signal received taking account of the impulse response of the transmission channel, but to a transformed channel and to a filtered signal. For example, the transformed channel may be a channel whose impulse response is of the phase minimum type. A phase minimum impulse response is an impulse response for which all the zeros of the transfer function (in this instance, all the roots of the polynomial representative of this impulse response) lie inside the unit circle. The impulse response is therefore more stable and, by obtaining a more stable impulse response, the energy at the start of the impulse response is reduced.

Thus, there is a significant improvement in the performance of an equalization algorithm, most especially an algorithm of the DFSE type which uses a decision feedback mechanism. Now, if a decision error occurs, it will be propagated by the decision feedback mechanism. Also, by applying the equalization processing operation while taking account of a phase minimum impulse response, these errors can be significantly minimized.

Of course, in combination with this transformation of the impulse response of the channel, it may be necessary to filter the signal received by a filter. This makes it possible, in particular, to retain equality between the autocorrelation of the signal received and the autocorrelation of the filtered signal. This is done so as not to corrupt the subsequent extraction of the data by the equalization processing operation. In fact, the transformation processing operation according to the invention enables all the autocorrelations to be retained in this way. That is, it makes it possible to preserve the equality between the autocorrelation of the signal received and the autocorrelation of the filtered signal, and also the autocorrelation between the impulse response of the channel and the impulse response of the transformed channel, or again the autocorrelation between a noise signal and the filtered noise signal (autocorrelation of additive noise).

Several embodiments are possible for determining the transformed impulse response on the basis of the estimated impulse response of the transmission channel. For example, a first possibility may include determining this transformed impulse response on the basis of an autocorrelation of the estimated impulse response of the transmission channel. It is also possible to determine, according to another embodiment, the transformed impulse response on the basis of a decomposition of the polynomial representative of the impulse response of the transmission channel into the product of a first polynomial whose roots all have a modulus greater than 1 and a second polynomial whose roots all have a modulus less than 1.

The invention also relates to a device for extracting digital data contained in a signal conveyed by an information transmission channel including an information sender, an information receiver, and a means of propagation extending between the sender and the receiver. The device may include, in the receiever, estimation means able to perform an estimation processing of the impulse response of the transmission channel, transformation means, and an equalizer. The transformation means may include a preprocessing block able to determine a so-called "phase minimum" transformed impulse response corresponding to a transformed channel based upon the estimated impulse response of the transmission channel and a filter able to perform a filtering of the signal received. This makes it possible to retain equality between the autocorrelation of the signal received and the autocorrelation of the filtered signal. Further, the equalizer may be able to apply an equalization processing operation to the filtered signal while taking account of the transformed impulse response.

The preprocessing block may determine the transformed impulse response based upon an autocorrelation of the estimated impulse response of the transmission channel. The processing block may also be able to determine the transformed impulse response based upon a decomposition of the polynomial representative of the impulse response of the transmission channel into the product of a first polynomial whose roots all have a modulus greater than 1 and a second polynomial whose roots all have a modulus less than 1.

A digital receiver is also provided according to the invention, such as a cellular mobile telephone incorporating a digital data extraction device as described above, for example. Furthermore, a computer program is also provided according to the invention which includes program-code means implementing the data extraction process as defined above when the program is performed within a processor. Additionally, a device is also provided according to the invention (e.g., a read only memory) that is capable of being read by a processor and includes program-code means able to implement the extraction process described above when the program is executed within the processor.

BRIEF DESCRIPTION OF THE DRAWINGS

Other advantages and characteristics of the invention will become apparent upon examining the detailed description of embodiments and modes of implementation, given by way of non-limiting example, and the appended drawings, in which.

DETAILED DESCRIPTION OF THE PREFERRED EMBODIMENTS

Figure 1:
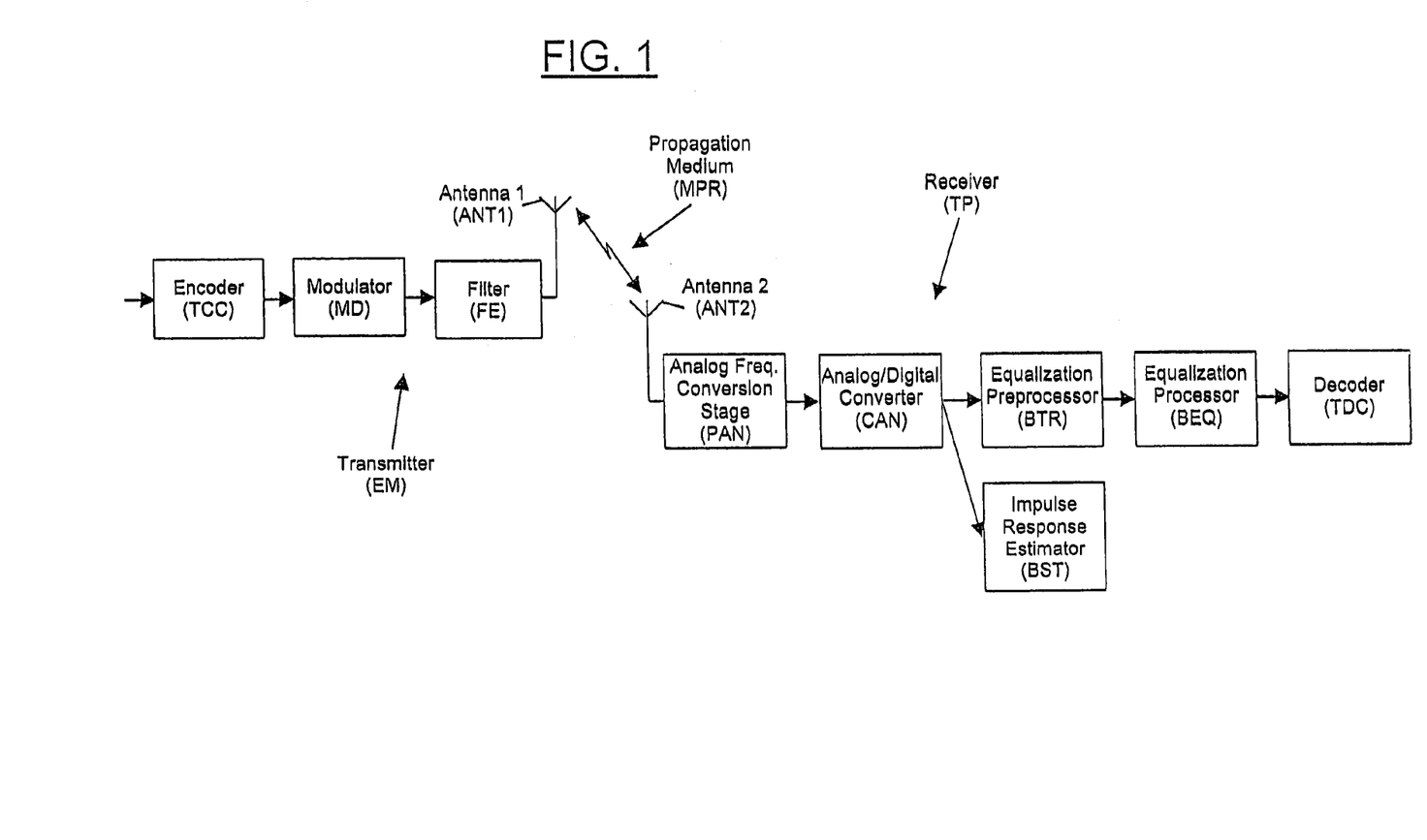
FIG. 1 is a schematic diagram illustrating a sender and a receiver for implementing a process according to the invention.

Referring now to FIG. 1, it will be assumed for clarity of illustration that the invention is applied, for example, to the domain of cellular mobile telephones, such as those of the GSM network. The reference EM designates a sender including a coding block TCC upstream and receiving the data to be transmitted, e.g., speech. The block TCC may perform "channel coding" processing, introduction of redundancies into the data stream, interlacing processing, encryption and formatting. The output from the TCC block includes binary information blocks.

The TCC block is conventionally followed by a modulator MD performing, for example, a quadrature modulation of the QPSK or 8PSK type, as will be appreciated by those of skill in the art, and transforming the binary signal into an analog signal. This analog signal is then filtered in a send filter FE before being sent to the receivers via an antenna ANT1. The means of propagation MPR between a sender EM and a receiver TP, here a cellular mobile telephone, is in the present case air.

The receiver TP, or cellular mobile telephone, may include at the front end an antenna ANT2 coupled to an analog stage PAN. The analog stage PAN carries out a frequency conversion to bring the modulated signal received into baseband and a filtering to retain only the useful part of the spectrum. After analog/digital conversion in a converter CAN, the role of the digital stage is to produce an estimate of the transmission channel to eliminate the inter-symbol interference by virtue of this estimate (by equalization processing operation), and in general to perform error correction. That is, the error correction may involve decoding in a conventional manner, such as Viterbi decoding, deinterlacing, etc Functionally, the digital stage includes a block BST for estimating the impulse response of the transmission channel and a block BTR. The block BTR includes a preprocessing block for performing an equalization preprocessing operation of the impulse response of the channel as well as a digital filter performing a filtering of the signal received. The output from the block BTR is delivered to a block BEQ for performing the equalization processing operation. The later channel decoding processing operations are performed in a channel decoding block TDC.

With respect to hardware, these blocks may be embodied in software fashion and implemented within a microprocessor, such as a signal processing microprocessor, for example, associated with a read only memory and/or with a random access memory. The transmission channel includes the elements situated upstream of the channel estimator block, i.e., particularly the analog sending and receiving devices as well as of the physical means of propagation MPR.

The impulse response $R(z)$ of the transmission channel is a polynomial in $z^{-1}$, the number of coefficients of which is predetermined and depends in particular upon the characteristics of the sending And receiving devices, and also on the signal propagation environment (hilly path, urban, etc). Stated otherwise, $R(z)$ is defined by formula (1) below:

$$R(z) = \sum_i r_i z^{-1} \tag{1}$$

in which $r_i$ are the complex coefficients of the polynomial, which we seek to estimate.

This estimation may be performed in a conventional manner known to the person skilled in the art. More precisely, one may use a learned estimate, i.e., one which uses training sequences formed by successions of bits of known value. In this case, each signal received S is defined by the matrix formula (2) below:

$$S = A \cdot R + N \tag{2}$$

in which A designates the matrix representative of the training sequence, R represents the vector formed by the coefficients $r_i$ of the impulse response of the channel, and N an additional vector representative of interference and of thermal noise.

A conventional way of solving this system, i.e., of estimating the coefficients $r_i$ of the impulse response R of the channel, includes using a least squares method to determine R as being the vector which minimizes the noise N. As will be appreciated by those of skill in the art, the vector R will therefore be defined by formula (3) below:

$$R = (A^H A)^{-1} A^H S \tag{3}$$

in which the notation "H" designates the conjugate transposed matrix. Of course, other methods may also be used to estimate the coefficients of the impulse response of the channel. These other methods are also well known to the person skilled in the art and they will not be discussed in further detail herein.

Figure 2:
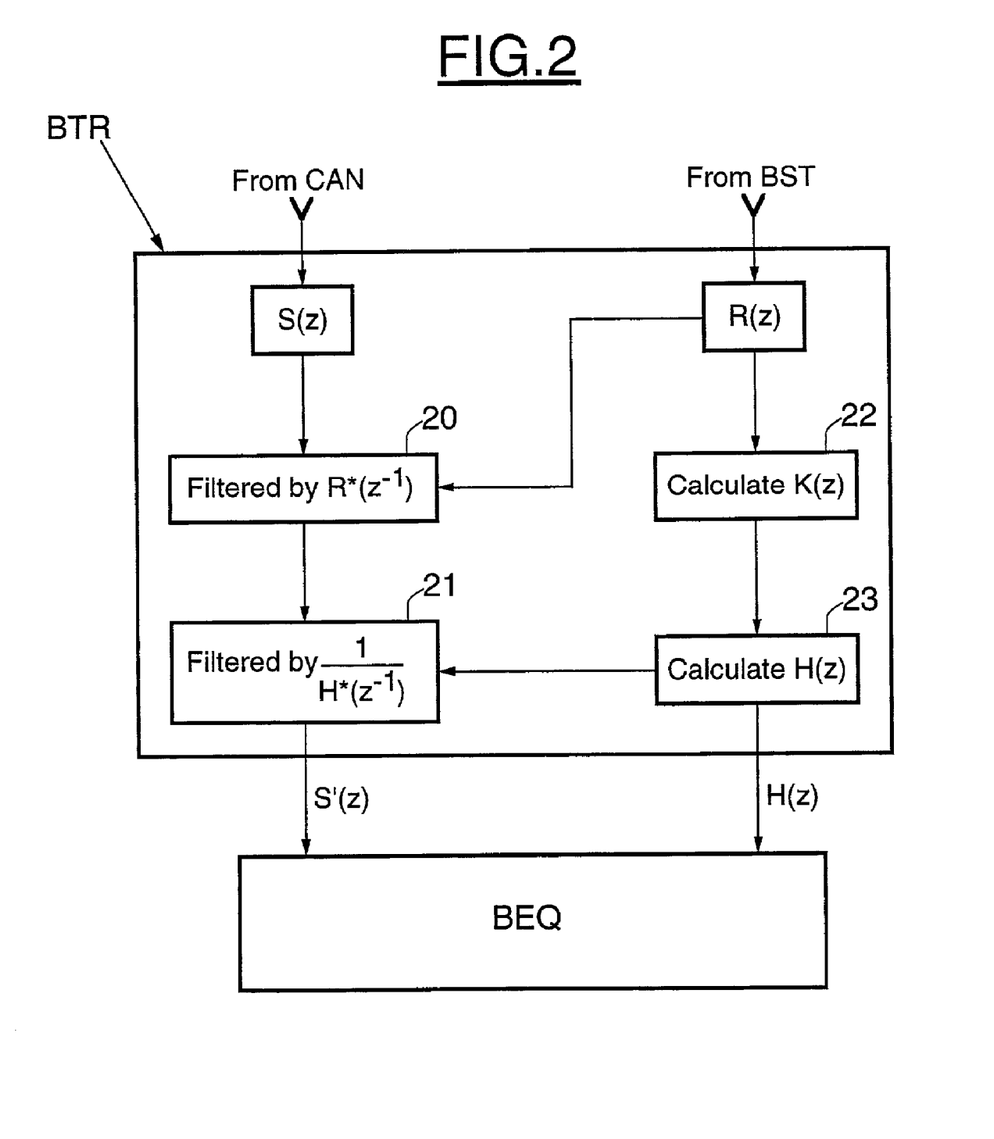
FIG. 2 is a flow diagram of the process steps conducted by block BTR of FIG. 1 according to one embodiment of the invention.
Figure 3:
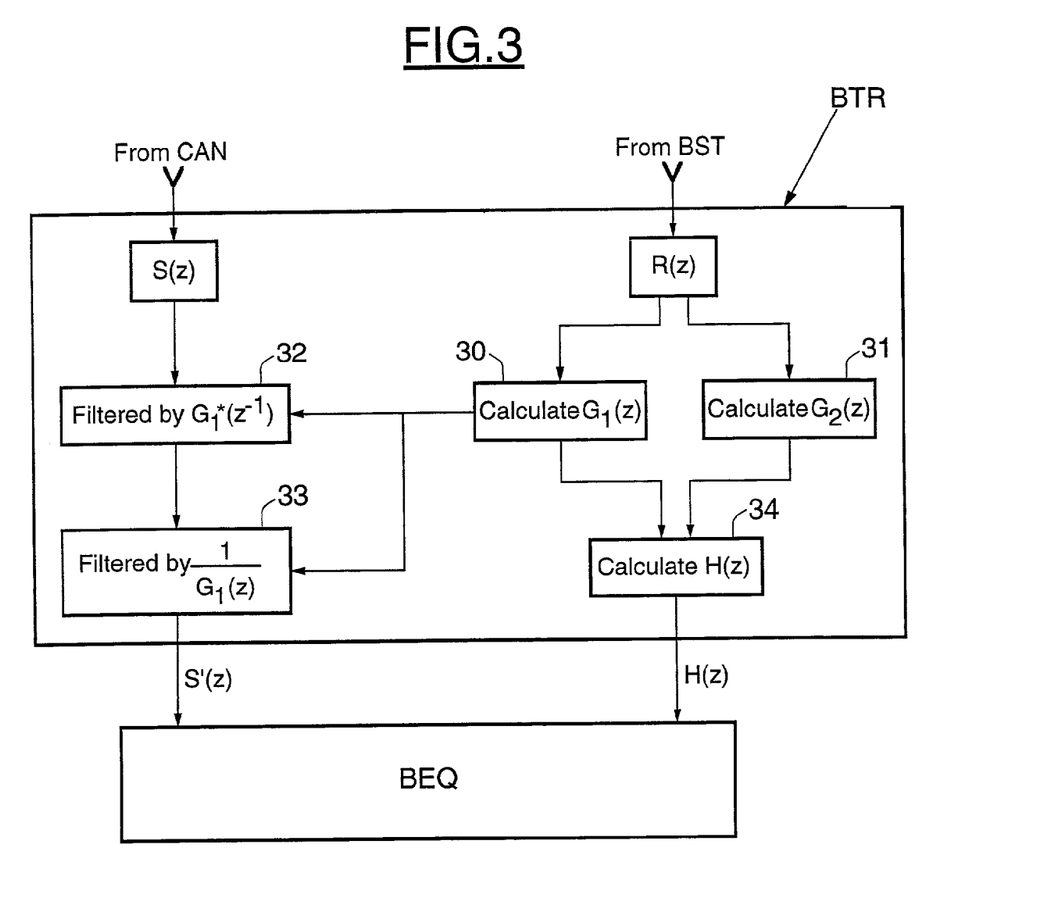
FIG. 3 is a flow diagram of the process steps conducted by block BTR of FIG. 1 according to another embodiment of the invention.
Figure 4:
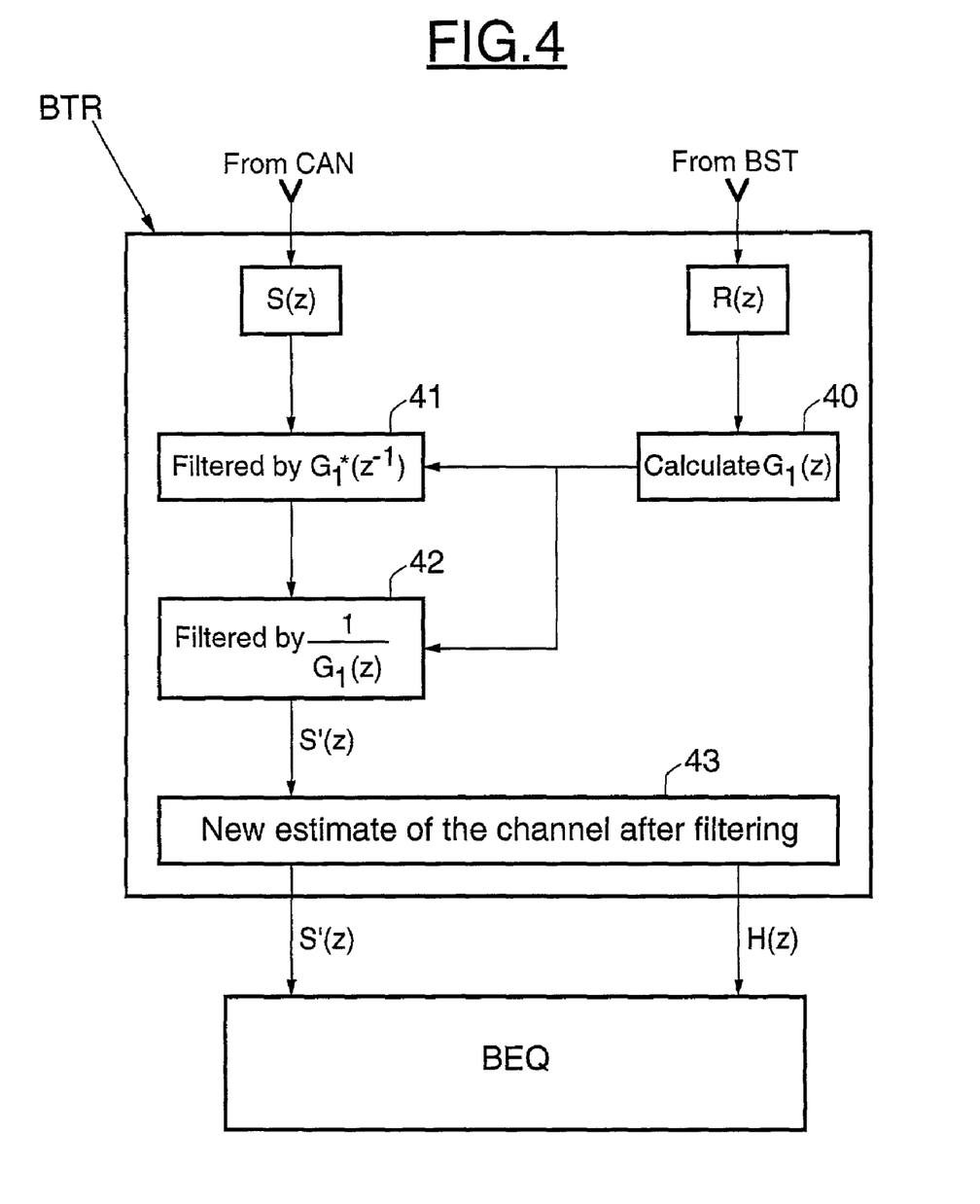
FIG. 4 is a flow diagram of the process steps conducted by block BTR of FIG. 1 according to yet another embodiment of the invention.

Reference is now made to FIGS. 2 to 4 to describe in greater detail various alternatives of the equalization processing operation performed in the block BTR. Regardless of the alternative used, the equalization processing operation performed in the block BTR includes a determination of a phase minimum transformed impulse response corresponding to a transformed channel and a filtering of the signal received by a filter. This makes it possible to retain equality between the autocorrelation of the signal received and the autocorrelation of the filtered signal.

In FIG. 2, the determination of the transformed impulse response H(z) of the transformed channel is performed on the basis of an autocorrelation of the estimated impulse response R(z) of the transmission channel. More precisely, the autocorrelation K(z) of the estimated impulse response R(z) of the channel is calculated on the basis of the estimated impulse response R(z) of the transmission channel (step 22). That is, K(z) is defined by formula (4) below:

$$K(z) = R(z) \cdot R^*(z^{-1}) \tag{4}$$

in which the notation "*" represents the complex conjugate. Stated otherwise, $R^*(z^{-1})$ is defined by formula (5) below:

$$R*(z^{-1}) = \sum_i r*i^{i'}$$

In matrix notation, it will be appreciated by those skilled in the art that formula (4) translates into formula (6) below:

$$K = R \cdot R^H \tag{6}$$

in which K is then a positive definite Hermitian matrix.

To determine the phase minimum transformed impulse response H(z), we seek to decompose the autocorrelation K defined by formula (4) into the product defined by formula (7) below:

$$K(z) = H(z) H^*(z^{-1}) \tag{7}$$

Those of skill in the art will appreciate that there are numerous methods for performing such a transformation. One example is the method of triangular matrix decomposition described in the article by Rissanen entitled "Algorithms for Triangular Decomposition of Block Hankel and Toeplitz Matrices with Application to Factoring Positive Matrix Polynomials," Mathematics of Computation, Volume 27, No. 121, January 1973.

More precisely, according to this method, the matrix K defined by formula (6) can be decomposed into two matrices, lower triangular and upper triangular which are the matrices H and HH. We then take the last row of the lower triangular matrix, for example, which then provides the coefficients hi of the phase minimum transformed impulse response H(z) (step 23). This transformed impulse response H(z), which is also a polynomial in $z^{-1}$, is said to be phase minimum since all the roots of this polynomial lie inside the unit circle, i.e., they all have a modulus less than 1.

In parallel with this calculation of the transformed impulse response H(z), the signal received S(z) is filtered in succession by two digital filters (steps 20 and 21), having impulse response $R^*(z^{-1})$ and $1/H^*(z^{-1})$, respectively. The z transform of the filtered signal S'(z) is therefore defined by formula (8) below:

$$S'(z)=S(z)\cdot R^*(z^{-1})/H^*(z^{-1}) \quad (8)$$

It will therefore be appreciated by those of skill in the art that the autocorrelation of the filtered signal S' is equal to the autocorrelation of the signal S. The equalization block BEQ will then apply an equalization processing operation to the filtered signal S', having regard for the transformed impulse response H. The equalization processing operation applied in the block BEQ is a conventions equalization processing operation employing, for example, either the MLSE algorithm when it can be implemented, the DFSE algorithm, or the DFE algorithm.

In the prior art, such equalization algorithms may be used to solve the equation defined by formula (9) below (z transform):

$$S(z)=b(z)R(z)+N(z) \quad (9)$$

in which S(z) designates the sequence of bits received (the signal received), b(z) designates the useful bits of the pulse train to be decoded, R(z) designates the impulse response of the transmission channel, and N(z) designates the noise.

According to the invention, these same equalization algorithms will now be used to solve the equation defined by formula (10) below:

$$S'(z)=b(z) H(z)=N'(z) \quad (10)$$

in which S'(z) designates the filtered signal, b(z) still designates the useful bits of the pulse train to be decoded, H(z) designates the transformed impulse response of the channel, and N'(z) designates the filtered noise defined by formula (11) below:

$$N'(z)=N(z)R^*(z^{-1})/H^*(z^{-1}) \quad (11)$$

The person skilled in the art will observe that the autocorrelation of the impulse response of the filtered noise N'(z) is equal to the autocorrelation of the noise N(z). Moreover, the filter used in the transformation block BTR may be an all-pass filter, which does not amplify the initial noise.

In the alternative illustrated in FIG. 3, the transformed impulse responses H(z) is determined on the basis of a polynomial decomposition of the polynomial R(z). More precisely, we calculate two polynomials $G_1(z)$ and $G_2(z)$ (steps 30 and 31), such that the roots of one of these polynomials (e.g., the polynomial $G_2$) always have a modulus less than 1, while the roots of the other polynomial (e.g., the polynomial $G_1$) have roots of modulus greater than 1.

Numerous methods of extracting roots of polynomials, and consequently of polynomial decomposition, are available to the person skilled in the art. Further details on such methods may be found in an article by Markus Lang and Bernhard-Christian Frenzel entitled "Polynomial Root Finding", IEEE Signal Processing Letters, Volume 1, No. 10, October 1994.

This being the case, to preserve the various autocorrelations, and in particular the autocorrelation of the signal, the signal received S(z) is filtered by two digital filters respectively having impulse responses equal to $G_1^*(z-1)$ (step 32) and $1/G_1(z)$ (step 33). The filtered signal S'(z) is then defined by formula (12) below:

$$S'(z)=S(z)G_1^*(z^{-1})/G_1(z) \quad (12)$$

It then follows that the transformed impulse response H(z) is defined and calculated according to formula (13) below:

$$H(z)=G_1^*(z^{-1})G_2(z) \quad (13)$$

In this regard, those skilled in the art will note that since the impulse response $G_1(z)$ is of the phase maximum type, $G_1^*(z^{-1})$ is of the phase minimum type. Consequently, the impulse response H(z) is the product of two phase minimum impulse responses and is therefore itself phase minimum.

Furthermore, the filter $G_1^*(z^{-1})/G_1(z)$ is also an all-pass filter. This has the effect of leading after transformation to noise N' defined by formula (14) below:

$$N'(z)=N(z)G_1^*(z^{-1})/G_1(z) \quad (14)$$

The spectrum of the initial noise N is thus preserved by the filtering operation.

The alternative illustrated in FIG. 4 is distinguished from that illustrated in FIG. 3 in that the transformed impulse response of the transformed channel is not calculated according to formula (13). Rather, it is re-estimated (step 43) in the channel estimation block BST, this time using the filtered signal S' and, of course, the training sequences. The filtered signal S' is filtered (steps 41 and 42) by the same filters as those described with reference to FIG. 3 and obtained on the basis of the determination of $G_1(z)$ (step 40).

Of course, the invention is not limited to a cellular mobile telephone, but applies to any digital receiver. In particular, the invention also applies to a base station communicating with a telephone and receiving the information sent by the telephone.

That which is claimed is:

1. A method for extracting digital data from a signal conveyed by an information transmission channel comprising an information sender, an information receiver, and means of propagation extending therebetween, the method comprising:

estimating an impulse response of the information transmission channel at the information receiver;

performing an equalization processing operation at the information receiver comprising:
determining a phase minimum transformed impulse response for a transformed channel based upon the estimated impulse response of the information transmission channel, and
filtering the received signal using a filter to preserve equality between an autocorrelation of the received signal and an autocorrelation of the filtered signal; and applying an equalization processing operation at the information receiver to the filtered signal while accounting for the phase minimum transformed impulse response.

2. The method according to claim 1 wherein the phase minimum transformed impulse response is determined based upon an autocorrelation of the estimated impulse response of the transmission channel.

3. The method according to claim 1 wherein the phase minimum transformed impulse respondes is determined based upon a decomposition of a polynomial representative of the impulse response of the transmission channel into a product of a first polynomial whose roots have a modulus greater than 1 and a second polynomial whose roots have a modulus less than 1.

4. A method for extracting digital data from a signal conveyed by an information transmission channel:
   estimating an impulse response of the information transmission channel;
   performing an equalization processing operation comprising:
      determining a phase minimum transformed impulse response for a transformed channel based upon the estimated impulse response of the information transmission channel, and
      filtering the signal using a filter to preserve equality between an autocorrelation of the received signal and an autocorrelation of the filtered signal; and
   applying an equalization processing operation to the filtered signal while accounting f or the phase minimum transformed impulse response.

5. The method according to claim 4 wherein the phase minimum transformed impulse response is determined based upon an autocorrelation of the estimated impulse response of the transmission channel.

6. The method according to claim 4 wherein the phase minimum transformed impulse response is determined based upon a decomposition of a polynomial representative of the impulse response of the transmission channel into a product of a first polynomial whose roots have a modulus greater than 1 and a second polynomial whose roots have a modulus less than 1.

7. A device for extracting digital data from a signal conveyed by an information transmission channel comprising an information sender, an information receiver, and a means of propagation extending therebetween, the device extracting the digital data at the information receiver and comprising:
   estimation means for performing an estimation processing of an impulse response of the transmission channel;
   transformation means comprising:
      a preprocessor for determining a phase minimum transformed impulse response corresponding to a transformed channel based upon the estimated impulse response of the information transmission channel, and
      a filter for filtering the received signal to retain equality between an autocorrelation of the received signal and an autocorrelation of the filtered signal; and
   an equalizer for applying an equalization processing operation to the filtered signal while accounting for the phase minimum transformed impulse response.

8. The device according to claim 7 wherein said preprocessor determines the phase minimum transformed impulse response based upon an autocorrelation of the estimated impulse response of the transmission channel.

9. The device according to claim 7 wherein said preprocessor determines the phase minimum transformed impulse response based upon a decomposition of a polynomial representative of the impulse response of the transmission channel into the product of a first polynomial whose roots have a modulus greater than 1 and a second polynomial whose roots have a modulus less than 1.

10. A device for extracting digital data from a signal conveyed by an information transmission channel comprising an information sender, an information receiver, and a propagation medium extending therebetween, the device extracting the digital data at the information receiver and comprising:
    an estimator for performing an estimation processing of an impulse response of the transmission channel;
    a transformer comprising:
       a preprocessor for determining a phase minimum transformed impulse response corresponding to a transformed channel based upon the estimated impulse response of the information transmission channel, and
       a filter for filtering the received signal to retain equality between an autocorrelation of the received signal and an autocorrelation of the filtered signal; and
    an equalizer for applying an equalization processing operation to the filtered signal while accounting for the phase minimum transformed impulse response.

11. The device according to claim 10 wherein said preprocessor determines the phase minimum transformed impulse response based upon an autocorrelation of the estimated impulse response of the transmission channel.

12. The device according to claim 10 wherein said preprocessor determines the phase minimum transformed impulse response based upon a decomposition of a polynomial representative of the impulse response of the transmission channel into the product of a first polynomial whose roots have a modulus greater than 1 and a second polynomial whose roots have a modulus less than 1.

13. A digital receiver for receiving a signal comprising digital data comprising:
    a device for extracting the digital data from the received signal comprising:
    estimation means for performing an estimation processing of an impulse response of the transmission channel,
       transformation means comprising a preprocessor for determining a phase minimum transformed impulse response corresponding to a transformed channel based upon the estimated impulse response of the information transmission channel and a filter for filtering the received signal to retain equality between an autocorrelation of the received signal and an autocorrelation of the filtered signal, and
       an equalizer for applying an equalization processing operation to the filtered signal while accounting for the phase minimum transformed impulse response.

14. The digital receiver according to claim 13 wherein said preprocessor determines the phase minimum transformed impulse response based upon an autocorrelation of the estimated impulse response of the transmission channel.

15. The digital receiver according to claim 13 wherein said preprocessor determines the phase minimum transformed impulse response based upon a decomposition of a polynomial representative of the impulse response of the transmission channel into the product of a first polynomial whose roots have a modulus greater than 1 and a second polynomial whose roots have a modulus less than 1.

16. A computer-readable medium having computer executable instructions for extracting digital data from a signal conveyed by an information transmission channel comprising an information sender, an information receiver, and means of propagation extending therebetween by performing the steps comprising:

estimating an impulse response of the transmission channel at the receiver;

performing an equalization processing operation at the receiver comprising:

determining a phase minimum transformed impulse response for a transformed channel based upon the estimated impulse response of the information transmission channel, and filtering the received signal using a filter to preserve equality between an autocorrelation of the received signal and an autocorrelation of the filtered signal; and applying an equalization processing operation at the receiver to the filtered signal while accounting for the phase minimum transformed impulse response.

17. The computer-readable medium according to claim 16 wherein the phase minimum transformed impulse response is determined based upon an autocorrelation of the estimated impulse response of the transmission channel.

18. The computer-readable medium according to claim 16 wherein the phase minimum transformed impulse response is determined based upon a decomposition of a polynomial representative of the impulse response of the transmission channel into a product of a first polynomial whose roots have a modulus greater than 1 and a second polynomial whose roots have a modulus less than 1.

* * * * *

UNITED STATES PATENT AND TRADEMARK OFFICE
CERTIFICATE OF CORRECTION

PATENT NO. : 7,035,357 B2  Page 1 of 1
APPLICATION NO. : 09/876879
DATED : April 25, 2006
INVENTOR(S) : Bonhomme It is certified that error appears in the above-identified patent and that said Letters Patent is hereby corrected as shown below:

Column 4, Line 6        Delete: "receiever"
                        Insert: --receiver--

Column 5, Line 51       Delete: "sending And"
                        Insert: --sending and--

Column 7, Line 9        Delete: "hi"
                        Insert: --$h_i$--

Column 9, Line 6        Delete: "respondes"
                        Insert: --responds--

Column 9, Line 26       Delete: "f or"
                        Insert: --for--

Signed and Sealed this

Twenty-eighth Day of November, 2006

JON W. DUDAS
*Director of the United States Patent and Trademark Office*